US006804828B1

(12) United States Patent
Shibata

(10) Patent No.: US 6,804,828 B1
(45) Date of Patent: Oct. 12, 2004

(54) TAP DEVICE OF CABLE BROADCASTING SYSTEM

(75) Inventor: Eiji Shibata, Nisshin (JP)

(73) Assignee: Masprodenkoh Kabushikikaisha, Nisshin (JP)

( * ) Notice: Subject to any disclaimer, the term of this patent is extended or adjusted under 35 U.S.C. 154(b) by 0 days.

(21) Appl. No.: 09/452,781

(22) Filed: Dec. 2, 1999

(30) Foreign Application Priority Data

Dec. 3, 1998 (JP) .......................................... 10-344279

(51) Int. Cl.[7] .......................... H04N 7/173; H04N 7/16; H01P 5/12; H01P 1/10; G05B 24/02

(52) U.S. Cl. ......................... 725/149; 725/94; 725/116; 725/118; 725/119; 725/126; 725/127; 725/128; 725/129; 725/148; 333/258; 333/262; 333/101; 333/166; 333/351

(58) Field of Search ................................ 725/127, 149, 725/94, 116, 119, 130, 126, 118, 148, 128, 129; 333/166, 101, 258, 262; 323/351

(56) References Cited

U.S. PATENT DOCUMENTS

| | | | | | |
|---|---|---|---|---|---|
| 4,118,669 | A | * | 10/1978 | Fung | 725/25 |
| 4,161,751 | A | * | 7/1979 | Ost | 358/114 |
| 4,198,624 | A | * | 4/1980 | Watanabe | 340/505 |
| 4,367,557 | A | * | 1/1983 | Stern et al. | 455/4 |
| 4,430,731 | A | * | 2/1984 | Gimple et al. | 725/131 |
| 4,577,224 | A | * | 3/1986 | Ost | 358/114 |
| 4,586,077 | A | * | 4/1986 | Wonn et al. | 358/86 |
| 4,673,976 | A | * | 6/1987 | Wreford-Howard | 725/120 |
| 4,776,010 | A | * | 10/1988 | Noda et al. | 725/107 |
| 4,807,052 | A | * | 2/1989 | Amano | 348/734 |
| 5,109,286 | A | * | 4/1992 | West et al. | 725/127 |
| 5,182,640 | A | * | 1/1993 | Takano | 348/722 |
| 5,331,412 | A | * | 7/1994 | Farmer et al. | 348/5.5 |
| 5,376,998 | A | * | 12/1994 | Suzuki | 399/88 |
| 5,781,419 | A | * | 7/1998 | Kutkut et al. | 363/17 |
| 5,781,844 | A | * | 7/1998 | Spriester et al. | 455/3.3 |
| 5,784,683 | A | * | 7/1998 | Sistanizadeh et al. | 455/5.1 |
| 5,815,794 | A | * | 9/1998 | Williams | 455/5.1 |
| 5,819,159 | A | * | 10/1998 | Dail | 455/5.1 |
| 5,867,764 | A | * | 2/1999 | Williams | 455/5.1 |
| 5,870,513 | A | * | 2/1999 | Williams | 385/24 |
| 5,949,301 | A | * | 9/1999 | Clarke, Jr. et al. | 333/101 |
| 6,033,101 | A | * | 3/2000 | Reddick et al. | 364/514 R |
| 6,037,848 | A | * | 3/2000 | Alila et al. | 333/202 |
| H1858 | H | * | 9/2000 | Ibelings | 725/121 |
| 6,130,703 | A | * | 10/2000 | Spriester et al. | 348/6 |
| 6,178,447 | B1 | * | 1/2001 | Wannenmacher et al. | 709/219 |
| 6,426,883 | B1 | * | 7/2002 | Stanley | 363/16 |
| 6,463,588 | B1 | * | 10/2002 | Jenkins et al. | 725/127 |

* cited by examiner

*Primary Examiner*—Vivek Srivastava
*Assistant Examiner*—Son P. Huynh
(74) *Attorney, Agent, or Firm*—Davis & Bujold, P.L.L.C.

(57) ABSTRACT

A part of transmission signal is branched by a directional coupler, and split by a splitting circuit, so that the transmission signal can be outputted to the subscribers' terminal devices via branched output terminals. Latching relays disposed in signal paths to the branched output terminals from the splitting circuit can set the output/stop of the transmission signal to the terminal devices. A control circuit switches the connected/disconnected state of the relays in response to the command signal from the center apparatus. When an operation switch is turned on, all the relays are placed into the connected state. As a result, after the installation of the tap device, by operating the operation switch, the broadcasting signal can be distributed to the terminal devices before the command signal is received.

11 Claims, 4 Drawing Sheets

TAP DEVICE OF CABLE BROADCASTING SYSTEM

BACKGROUND OF THE INVENTION (i) Field of the Invention

The present invention relates to a tap device of a cable broadcasting system in which a part of transmission signal running through a transmission line leading to a terminal side from a center apparatus is branched and transmitted to a subscriber's terminal device, particularly to a tap device of a cable broadcasting system in which it can be switched on the side of the center apparatus whether or not the transmission signal is transmitted to the terminal device.

(ii) Description of the Related Art

In a conventional cable broadcasting system such as CATV system in which a broadcasting signal such as a television signal is transmitted to a subscriber's terminal device via one transmission line formed of a coaxial cable, and the like, the transmission line is provided with a tap device, so-called tap-off, for leading signals in order to branch the broadcasting signal from the transmission line and leading the signal into a subscriber's house.

Moreover, in a known tap device, it can easily be switched according to a subscriber's request or the like whether or not the broadcasting signal is distributed to the subscriber's house. Specifically, the tap device is provided with a relay disposed in a signal path between a directional coupler for branching a part of the broadcasting signal from the transmission line and a branched output terminal for outputting the branched broadcasting signal toward the subscriber's terminal device, in which a high-frequency broadcasting signal can be passed with a reduced loss. The relay is a so-called high-frequency relay, and a latching relay which can hold a switched state is usually used. By driving the relay in response to a command signal transmitted from the center apparatus via the transmission line, the connected/disconnected state of the signal path, in other words, the output or cut-off of the broadcasting signal to the terminal device can easily be switched on the side of the center apparatus.

When the conventional tap device is installed on the transmission line, an individual address is allocated to the device in order to distinguish the device from the other electronic apparatuses connected to the transmission line Additionally, when the center apparatus switches the output of the broadcasting signal to the branched output terminal of the tap device, a command signal including command data and the individual address of the tap device is generated This command signal is sent to the transmission line. In this case, on the side of the tap device, the command signal having the corresponding address is selected from various command signals transmitted via the transmission line, that is, the command signal from the center apparatus is extracted. By driving the relay based on a command included in the command signal, it is switched whether or not to transmit the broadcasting signal to the branched output terminal.

Therefore, according to the conventional tap device, it can easily be switched on the side of the center apparatus whether or not to transmit the broadcasting signal to the subscriber's terminal device from the branched output terminal. Therefore, an operator does not have to go to a place where the tap device is installed for the switching operation.

On the other hand, in the conventional tap device, a latching relay has been used as a high-frequency relay for connecting/disconnecting the signal path leading to the branched output terminal from the directional coupler, so that the power consumption in the tap device is reduced and the broadcasting signal can be distributed to the subscriber's terminal device even during a power failure.

This latching relay is also called a keep relay or a retaining relay. The position of a movable contact can be switched by energizing a relay coil. Once switched, even when the power supply to the relay coil is cut off, the position of the movable contact can be self-retained.

Specifically, in the conventional tap device, by using the latching relay to switch the connected/disconnected state of the signal path, the power amount necessary for switching the output/stop of the broadcasting signal from the branched output terminal can be minimized. Additionally, even when any power cannot be supplied to the relay coil because of the a power failure, the output/stop state of the broadcasting signal to the subscriber's terminal device can be retained.

In the latching relay, the position of the movable contact can usually be self-retained using a permanent magnet, and the position of the movable contact is determined by the power supply to the relay coil. Therefore, immediately after the conventional tap device is installed on the transmission line, the connected/disconnected state of the signal path leading to the branched output terminal from the directional coupler is not determined. In some cases the broadcasting signal cannot be distributed to the subscribers' terminal devices to which the broadcasting signal should be distributed.

Even when the broadcasting signal cannot be distributed to the subscribers' terminal devices immediately after the installation of the tap device on the transmission line, by subsequently transmitting the command signal for output switching from the center apparatus, the latching relay is driven or energized in response to the command signal, and the connected/disconnected state of the signal path is determined. Therefore, this is not a problem when a work for newly installing the tap device is performed.

However, when the tap device or a part of the tap device is once detached from the transmission line for the purpose of repairing, changing, checking and the like of the tap device, and is again installed, the distribution of the broadcasting signal to the subscribers is discontinued.

When the distribution of the broadcasting signal to the subscribers is discontinued, the distribution of the broadcasting signal needs to be quickly resumed. In the conventional tap device, however, when the tap device is installed on the transmission line, the connected/disconnected state of the signal path leading to the branched output terminal from the directional coupler is not determined until the command signal for the output switching is transmitted from the center apparatus. Therefore, in some cases, although the installation of the tap device is completed, the distribution of the broadcasting signal to the subscribers' terminal devices is discontinued for a long time.

SUMMARY OF THE INVENTION

Wherefore, an object of the present invention is to provide a tap device which can switch between outputting and stopping a broadcasting signal from a branched output terminal in response to a command signal transmitted from a center apparatus via a transmission line, so that the broadcasting signal can quickly be distributed to subscribers' terminal devices immediately after the tap device is connected to the transmission line.

To achieve this and other objects, the present invention provides a tap device which is connected to a transmission line leading to a terminal side from a center apparatus in the same manner as in the above-described conventional tap device, and which is provided with a directional coupler for branching a part of a transmission signal, for example, a broadcasting signal running through the transmission line to a subscriber's terminal device. The directional coupler branches a part of the transmission signal running through the transmission line, and transmits the branched transmission signal to the terminal device via a branched output terminal. A signal path for leading the transmission signal to the branched output terminal from the directional coupler is provided with a latching relay for switching a connected/disconnected state of the signal path.

In the tap device of the present invention, a receiving circuit receives a command signal indicating whether or not to output the transmission signal transmitted to the transmission line from the center apparatus via the branched output terminal, and a first controller drives the latching relay in response to the command signal received by the receiving circuit, so that the connected/disconnected state of the signal path, in other words, whether or not to output the transmission signal via the branched output terminal is controlled in accordance with the state of the command signal.

Moreover, the tap device of the present invention is provided with an operation switch for inputting an output command to output the transmission signal via the branched output terminal by manual operation. In this case, when the output command is inputted via the operation switch, a second controller drives the latching relay and performs control to place the signal path for leading the transmission signal to the branched output terminal from the directional coupler into the connected state.

Therefore, according to the tap device of the present invention, not only can it be set, in response to the command signal outputted from the center apparatus, whether or not to distribute the broadcasting signal to the subscriber's terminal device, but also the broadcasting signal can forcibly be distributed to the subscriber's terminal device by operating the operation switch on the site where the tap device is installed.

According to the present invention, by operating the operation switch immediately after the installation work of the tap device onto the transmission line is completed, the distribution of the broadcasting signal to the subscriber's terminal device can quickly be started. For example, when the repairing, changing, checking, and the like of the tap device is performed, the distribution of the broadcasting signal to the subscribers can be prevented from being discontinued for a long time. Thus, the quality of the broadcasting service to the subscribers can be enhanced.

Furthermore, the tap device is further provided with a splitting circuit for splitting the transmission signal branched by the directional coupler into a plurality of signals, and outputting the split transmission signals via a plurality of branched output terminals. In this case, latching relays are disposed in a plurality of signal paths leading to the plurality of branched output terminals from the splitting circuit. The first controller drives the latching relays of the signal paths in response to the command signals transmitted from the center apparatus, and controls the connected/disconnected states of the signal paths individually. The second controller drives the latching relays of the signal paths in response to the output command via the operation switch, and performs control to place all the signal paths into the connected states.

Specifically, in the tap device, the broadcasting signal can be distributed to a plurality of subscribers' terminal devices via the transmission line. Moreover, the latching relays are disposed on the signal paths leading to a plurality of branched output terminals from the splitting circuit. By switching the state of each latching relay in response to the command signal from the center apparatus, on the side of the center apparatus, it can be set, for each subscriber connected to the branched output terminal, whether or not to output the broadcasting signal via each branched output terminal. Furthermore, when an operator operates the operation switch on the site where the tap device is installed, the broadcasting signals can be outputted via all the branched output terminals.

Therefore, according to the tap device of the present invention, not only can it be set on the side of the center apparatus whether or not to distribute the broadcasting signal to each of a plurality of subscribers' terminal devices, but also the distribution of the broadcasting signal to the subscribers' terminal devices can quickly be started by operating the operation switch immediately after the installation work of the tap device onto the transmission line is completed. Also in this case, when the repairing, changing, checking, or the like of the tap device is performed, the distribution of the broadcasting signal to the subscribers can be prevented from being discontinued for a long time, and the quality of the broadcasting service to the subscribers can be enhanced.

BRIEF DESCRIPTION OF THE DRAWINGS

An embodiment of the present invention will now be described with reference to the drawings, wherein.

DETAILED DESCRIPTION OF THE PREFERRED EMBODIMENT

Figure 1:
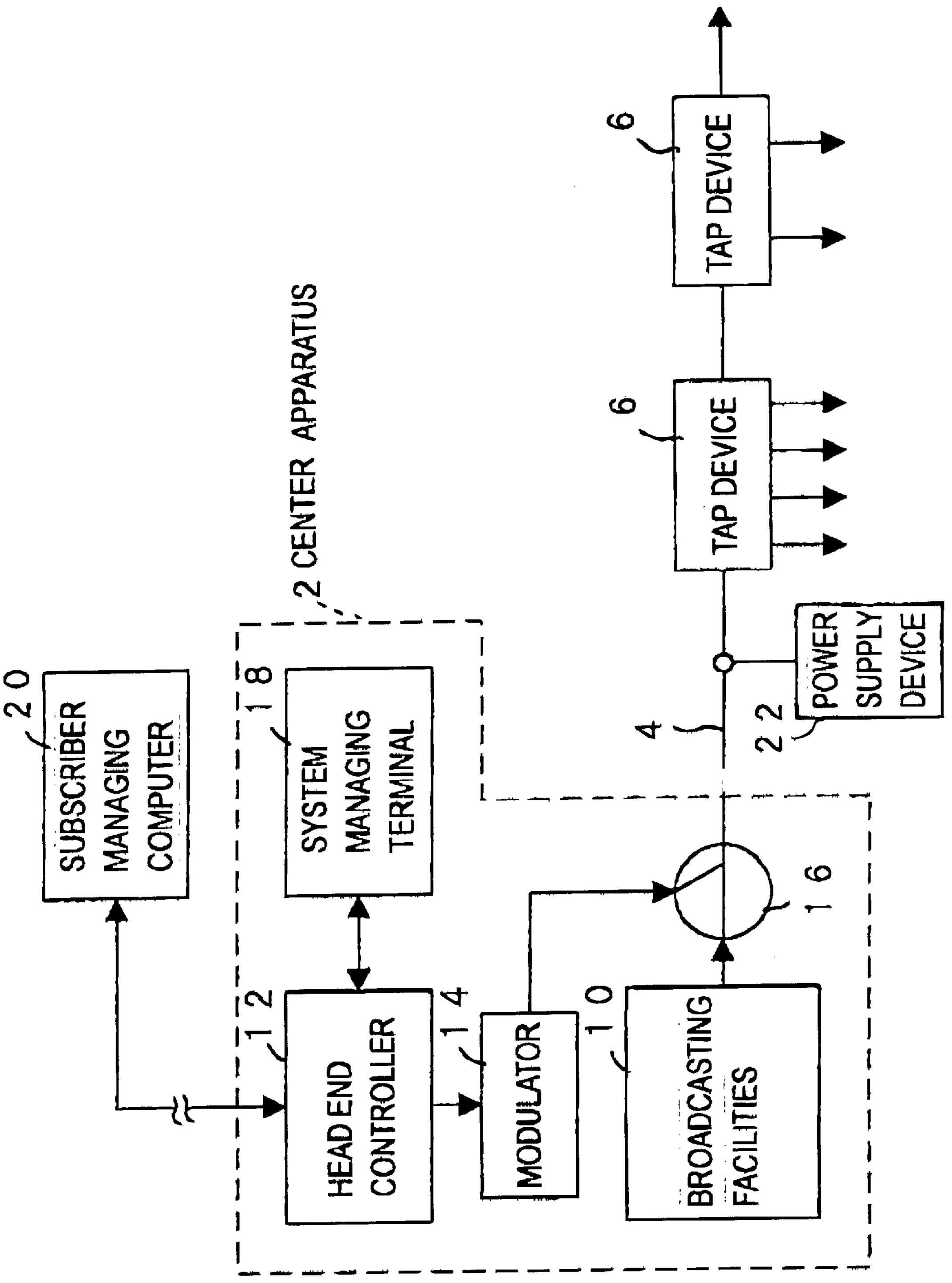
FIG. 1 is a block diagram showing the constitution of CATV system according to one embodiment of the present invention.

In the CATV system of the embodiment shown in FIG. 1, the broadcasting signal of a predetermined frequency band (e.g. 50 MHz to 770 MHz) is transmitted toward a terminal side from a center apparatus 2 via a transmission line 4, and the broadcasting signal is distributed to system subscribers' houses via a large number of tap devices 6 disposed on the transmission line 4.

The center apparatus 2 is provided with broadcasting facilities 10, in which a large number of television signals for broadcasting in the system are generated using a receiving antenna for receiving television broadcasting signals transmitted from artificial satellites or terrestrial stations, a video apparatus for reproducing television signals recorded in video tapes or video disks, a video camera for independent broadcasting, and the like, each television signal is converted to a broadcasting signal of a transmission frequency for predetermined channels, and the broadcasting signal is sent to the transmission line 4.

The center apparatus 2 is also provided with a head end controller 12 for generating transmission data including an address pre-allocated to each electronic apparatus and a command to transmit a command signal for controlling the operating states of the electronic apparatuses such as the tap devices 6 disposed on the transmission line 4; a modulator 14 for converting the transmission data from the head end controller 12 to a transmission command signal of the predetermined frequency band (e.g 70 MHz) by FSK modulation; and a mixer 16 for mixing the command signal transmitted from the modulator 14 and the broadcasting signal transmitted from the broadcasting facilities 10 to send the mixed signal to the transmission line 4.

Additionally, the head end controller 12 generates the transmission data according to the command from a system managing terminal device or computer 18 disposed in the center apparatus 2, or a subscriber managing computer 20 connected via a telephone line, and the like, and transmits the command signal to various electronic apparatuses in the CATV system so as to control the operating states of the apparatuses. The head end controller 12 is constituted by a computer which has a communication function.

On the other hand, the transmission line 4 is connected to a power supply device 22 for supplying an operating power to the tap devices 6 on the transmission line 4, amplifiers (not shown), and the like. The power supply device 22 receives a power supply from a commercial power source to operate, and supplies an alternating-current signal, for example, with a frequency of 60 Hz, and a voltage of about 45 V to about 90V to the transmission line 4. In consideration of the power consumption, and the like of the electronic apparatus as a power supply object, a plurality of such power supply devices are disposed in places on the transmission line 4 at the rate of one unit for a plurality of electronic apparatuses.

Furthermore, the tap device 6 is a so-called tap-off disposed on the transmission line 4 in the CATV system such as a trunk directly connected to the center apparatus 2, a branch line branched from the trunk via a trunk branching amplifier, a tap unit, and the like disposed on the trunk, and a spray line further branched from the branch line to distribute the broadcasting signal to the subscribers' terminal devices in the vicinity, and is provided with one or a plurality of branched output terminals. The tap device provided with four branched output terminals and the tap device provided with two branched output terminals are shown in FIG. 1.

Figure 2:
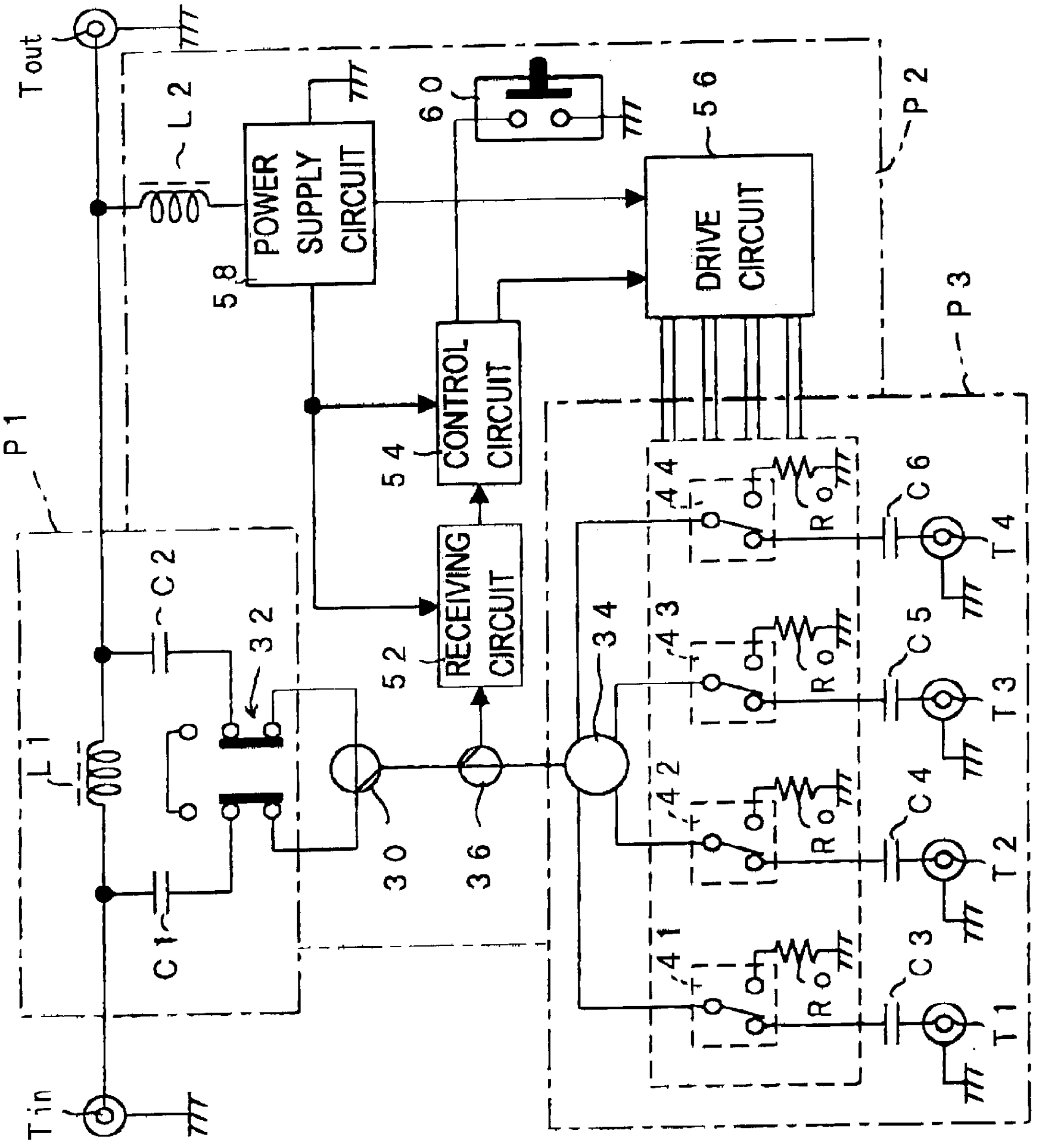
FIG. 2 is a circuit diagram showing the constitution of a tap device.

As shown in FIG. 2, the tap device 6 is provided with an input terminal Tin connected to the side of the center apparatus 2 of the transmission line 4, an output terminal Tout connected to the terminal side of the transmission line 4, and a plurality of (four in the drawing) branched output terminals T1 to T4.

Additionally, a choke coil L1 is connected between the input terminal Tin and the output terminal Tout for passing the alternating-current power signal with a low frequency supplied to the transmission line 4 from the power supply device 22 and for stopping the passage of the broadcasting signal and the command signal (hereinafter generically referred to as the high-frequency transmission signal) transmitted to the transmission line 4 from the center apparatus 2. Furthermore, opposite ends of the choke coil L1 are connected to one ends of capacitors C1 and C2 for cutting off the low-frequency alternating-current power signal and passing the high-frequency transmission signal, respectively. The other ends of the capacitors C1 and C2 are connected to a change-over switch 32 for changing between directly connecting these capacitors or connecting the capacitors via a directional coupler 30.

Additionally, when the other ends of the capacitors C1 and C2 are connected to the directional coupler 30, the high-frequency transmission signal transmitted via the input terminal Tin is transmitted toward the output terminal Tout, and a part of the high-frequency transmission signal is branched toward the branched output terminals T1 to T4.

Moreover, the choke coil L1, the capacitors C1, C2 and the change-over switch 32 are disposed on a first substrate P1 which is directly assembled to the housing of the tap device 6 together with the connectors constituting the input and output terminals Tin and Tout for connection to the transmission line or coaxial cable. The directional coupler 30 is disposed together with power supply circuits described later on a second substrate P2 which is detachably attached to the first substrate P1. Therefore, for example, when the change-over switch 32 is switched to the side opposite to the directional coupler 30, and the second substrate P2 is electrically separated from the first substrate P1, the tap device 6 merely serves as a bypass circuit for passing the alternating-current power signal and the high-frequency transmission signal via the choke coil L1 and the capacitors C1 and C2, and exerts no influence to the transmission signal running through the transmission line 4.

Subsequently, the high-frequency, transmission signal branched by the directional coupler 30 is transmitted to a splitting circuit 34 (four-part splitting circuit in the embodiment), in which the signal is split in accordance with the number of the branched output terminals T1 to T4. Thereafter, the split high-frequency transmission signals are transmitted to the branched output terminals T1 to T4 via capacitors C3 to C6 which pass only the high-frequency transmission signals and block the passage of low-frequency alternating-current power signals. The signals are then transmitted to the subscribers' terminal devices connected to the branched output terminals T1 to T4.

Moreover, the signal paths leading to the branched output terminals T1 to T4 from the splitting circuit 34 are provided with latching relays (hereinafter referred to as the relays) 41 to 44 for connecting/disconnecting the signal paths, and the signal path of the high-frequency transmission signal leading to the splitting circuit 34 from the directional coupler 30 is provided with a second directional coupler 36 for branching a part of the high-frequency transmission signal passing through the path The high-frequency transmission signal branched by the directional coupler 36 is transmitted to a receiving circuit 52.

The receiving circuit 52 selectively receives the command signal from the high-frequency transmission signals transmitted via the directional coupler 36, and demodulates the transmission data outputted by the head end controller 12. The demodulated received data is transmitted to a control circuit 54.

The control circuit 54 is mainly constituted of one chip microcomputer formed of CPU, ROM, RAM, and the like. When received data is transmitted from the receiving circuit 52, the control circuit 54 performs a first control processing of driving the relays 41 to 44 via a drive circuit 56 based on the received data, and switching between outputting and stopping of the high-frequency transmission signal via the branched output terminals T1 to T4.

Moreover, the control circuit 54 is connected to an operation switch 60 which is turned on by external operation and is of a normally open type. When this operation switch 60 is turned on, an output command is transmitted to the control circuit 54 to output the high-frequency transmission signal via the branched output terminals T1 to T4. When the operation switch 60 is turned on, the control circuit 54 performs a second control processing of driving the relays

41 to 44 via the drive circuit 56 to output the high-frequency transmission signal via the branched output terminals T1 to T4.

Furthermore, the tap device 6 is provided with a power supply circuit 58 connected to the output terminal Tout via a choke coil L2 The choke coil L2 leads a part of the AC power signal running through the transmission line 4 to the power supply circuit 58, and prevents the high-frequency transmission signal from running toward the power supply circuit 58. The power supply circuit 58 generates a power voltage V1 (e.g AC 24 V) for switching the ON/OFF states of the relays 41 to 44 and a power voltage V2 (e.g. DC 5 V) for driving the receiving circuit 52 and the control circuit 54 with a constant voltage from the AC power signal inputted via the choke coil L2.

Specifically, the power supply circuit 58 rectifies/smoothes the AC power signal inputted via the choke coil L2, and uses a three-terminal regulator or the like to generate the two types of power voltages V1, V2 from the rectified/smoothed power signal. The power voltage V1 for switching the relays is supplied to the drive circuit 56, and the operating power voltage V2 is supplied to the receiving circuit 52 and the control circuit 54.

Additionally, the splitting circuit 34, relays 41 to 44, capacitors C3 to C6 and branched output terminals T1 to T4 are disposed on a third substrate P3 which is integrally mounted onto the second substrate P2 on which the directional coupler 30 is disposed with screws, and the like. The second directional coupler 36, receiving circuit 52, control circuit 54, drive circuit 56, power supply circuit 58, and operation switch 60 are disposed together with the above-described directional coupler 30 on the second substrate P2.

Figure 3:
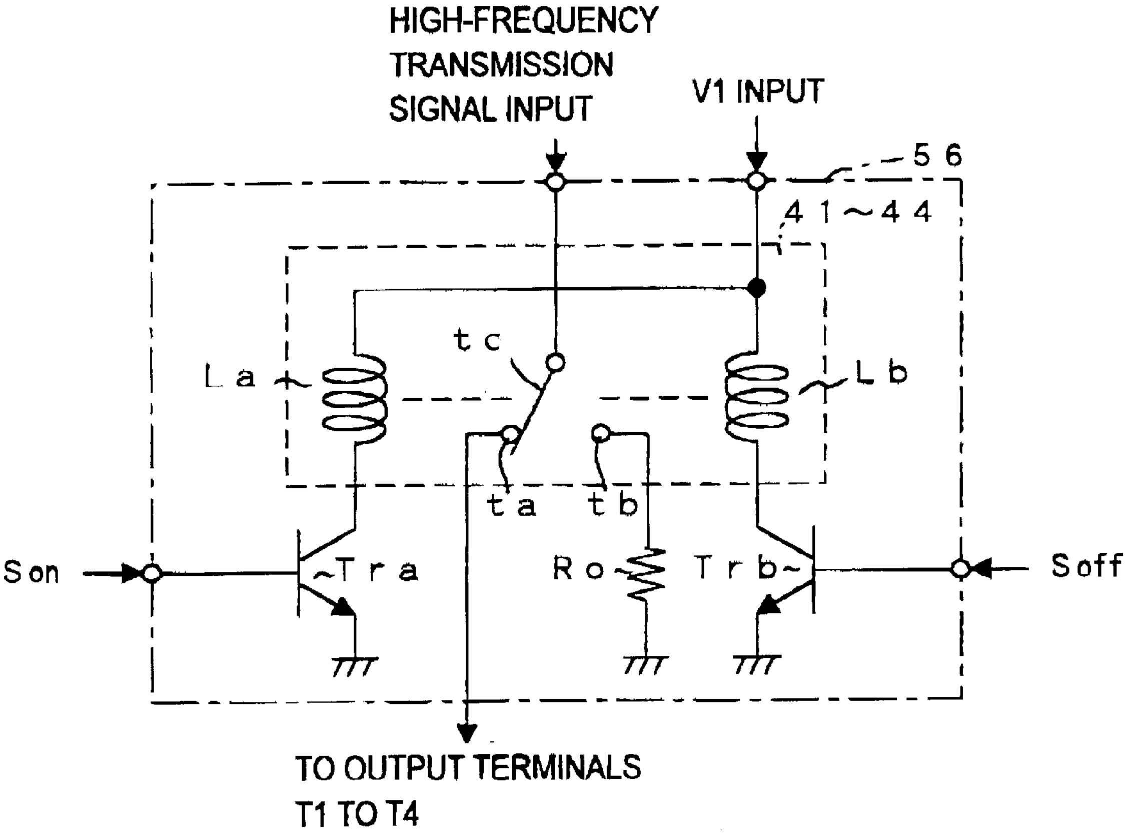
FIG. 3 is an electric circuit diagram showing the constitution of a latching relay and a drive circuit for energizing/driving the latching relay.

FIG. 3 is an electric circuit diagram showing the internal constitution of one of the relays 41 to 44, and the drive circuit 56 for the relay.

As shown in FIG. 3, each of the relays 41 to 44 is a known retaining relay provided with a movable contact tc for switching between outputting and stopping the high-frequency transmission signal inputted from the splitting circuit 34 toward the branched output terminals T1 to T4, a relay coil La for switching the movable contact tc toward a contact ta to pass the high-frequency transmission signal toward the branched output terminals T1 to T4, a relay coil Lb for switching the movable contact tc toward a contact tb to cut off the passage of the high-frequency transmission signal to the branched output terminals T1 to T4, and a permanent magnet (not shown) for retaining the connected or disconnected position of the movable contact tc which is set by energizing each coil La, Lb.

In the drive circuit 56, the power voltage V1 supplied from the power supply circuit 58 is applied to one end of a pair of relay coils La, Lb constituting each of the relays 41 to 44, and the other end of the relay coils La, Lb is grounded to a ground line in response to a control signal from the control circuit 54. Thereby, the relay coils La, Lb are energized to switch the position of the movable contact tc. In order to energize each relay coil La, Lb(i.e. for grounding), there are provided NPN transistors Tra, Trb, whose each collector is connected to the other end of each relay coil La, Lb, and whose each emitter is grounded to the ground line. Additionally, the potential of the ground line is the same as that of an outer conductor which is disposed around a core wire or inner conductor of the coaxial cable constituting the transmission line 4, and each signal path in the tap device 6 is connected to the core wire of the coaxial cable.

Furthermore, in order to place each of the relays 41 to 44 in the connected state, a high-level control signal Son is transmitted from the control circuit 54 to the base of the NPN transistor Tra on the side of the relay coil La. As a result, the NPN transistor Tra is placed in ON state, electric current flows through the relay coil La, and the movable contact tc is positioned on the side of the contact ta.

Oppositely, in order to place each of the relays 41 to 44 in the disconnected state, a high-level control signal Soff is transmitted from the control circuit 54 to the base of the NPN transistor Trb on the side of the relay coil Lb. As a result, the NPN transistor Trb is placed in ON state, electric current flows through the relay coil Lb, and the movable contact tc is positioned on the side of the contact tb.

Once the movable contact tc is switched to the side of the contact ta or tb in this manner by energizing the relay coil La or Lb, even when the power supply is cut off, the movable contact tc is subjected to a magnetic force from the permanent magnet (not shown), and held in the position.

Additionally, the contact tb is grounded to the ground line via a terminating resistor Ro having a resistance value corresponding to the impedance usually of 50 Ω or 75 Ω of the signal transmission system of the CATV system, that is, the transmission line 4, so that when the movable contact tc is switched to the side of the contact tb in order to cut off the signal path of the high-frequency transmission signal to each of the branched output terminals T1 to T4, the signal path is prevented from being opened, and the high-frequency transmission signal is prevented from being reflected toward the splitting circuit 34 via the opened end of the signal path.

Figure 4:
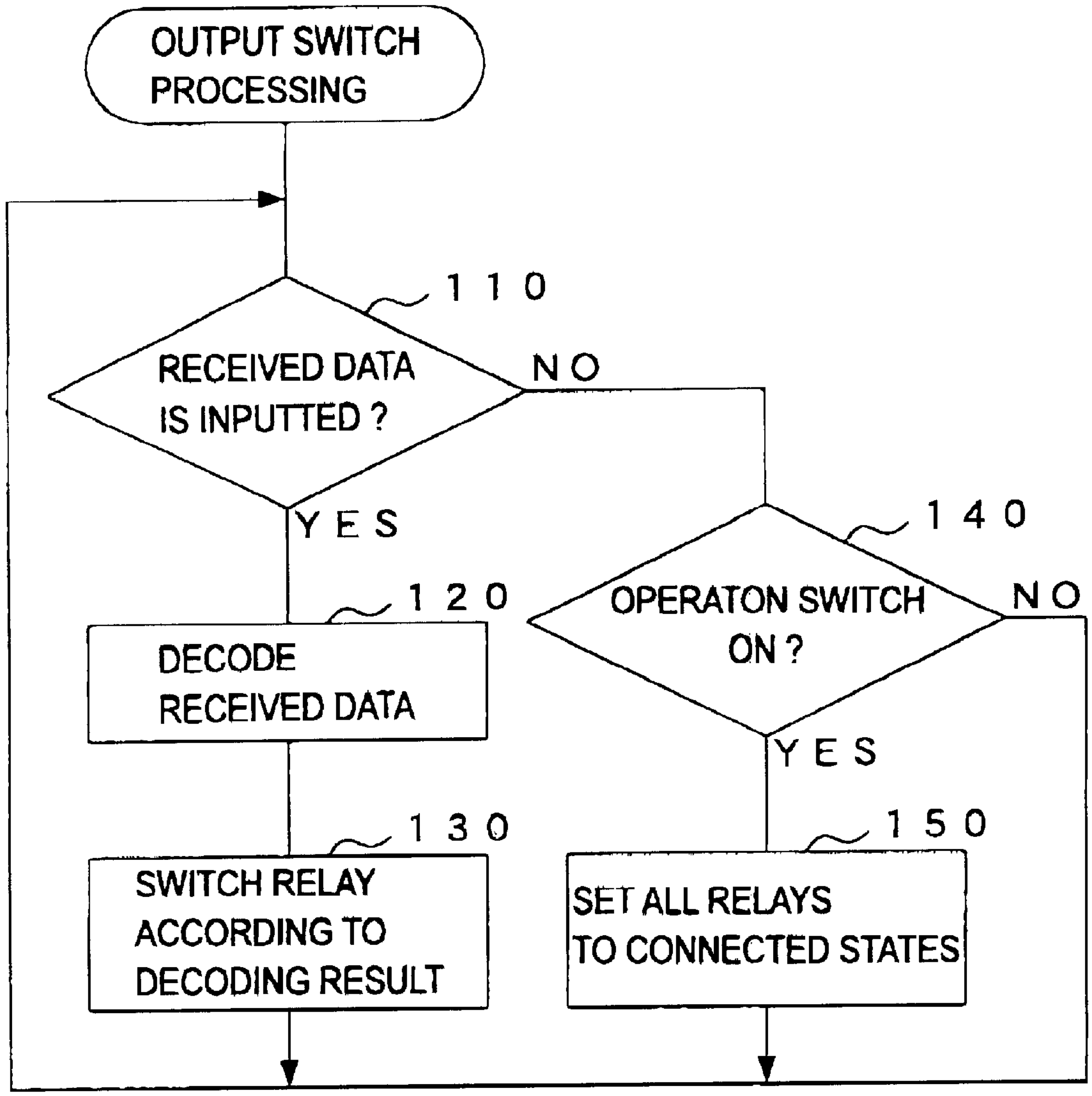
FIG. 4 is a flowchart showing a processing of switching outputs which is executed in a control circuit.

FIG. 4 is a flowchart showing an output switch processing which is executed in the control circuit 54 in order to set the output/stop state of the high-frequency transmission signal from each of the branched output terminals T1 to T4 according to the received data as the command signal inputted from the receiving circuit 52 or the output command inputted via the operation switch 60.

After the tap device 6 is connected to the transmission line 4, and the control circuit 54 receives power supply from the power supply circuit 58 to be ready for operating, this processing is repeatedly carried out in the control circuit 54.

As shown in FIG. 4, when this processing is started, it is first determined in step 110 whether or not the received data is transmitted from the receiving circuit 52. When the received data is inputted, in the next step 120, the received data is decoded.

The decoding of the received data is performed by determining whether the address attached to the received data agrees with the address pre-allocated to the tap device 6 and by determining whether the command signal received by the receiving circuit 52 is directed to the tap device 6. Subsequently, when the addresses agree with each other, the command for switching the output/stop of the high-frequency transmission signal via each of the branched output terminals T1 to T4 is decoded from the command attached to the address.

Subsequently, in the next step 130, the control signal is transmitted to the drive circuit 56 in accordance with the result of decoding, the relay coils La and Lb of the relays 41 to 44 are successively energized, and the connected/disconnected state of the signal path by each of the relays 41 to 44 is switched. After performing this first control processing, the process goes to the step 110 again. Additionally, as a matter of course, when the received data does not indicate the command signal to the tap device 6, in the step 130, the process shifts to the step 110 without energizing the relay coil La or Lb of each of the relays 41 to 44.

On the other hand, when it is determined in the step 110 that no received data is transmitted from the receiving circuit 52, the process shifts to step 140, in which it is determined whether or not the operation switch 60 is turned on. When the operation switch 60 is not in ON state, the process shifts to the step 110 again.

When it is determined in the step 140 that the operation switch 60 is in the ON state, the process shifts to step 150, in which a second control processing is executed. Specifically, the high-level control signal Son is transmitted to the NPN transistors Tra on the side of the relay coils La of all of the relays 41 to 44 in the drive circuit 56, the relay coils La of the relays are energized for a given time required for displacing the movable contact tc, and the states of all the signal paths by the relays are switched to the connected state. Then the process returns to the step 110.

Additionally, in the step 130 or 150, when the connected/disconnected states of the relays 41 to 44 are switched, the relay coils La or Lb of each of the relays 41 to 44 are successively energized, and a plurality of relay coils are not energized at the same time. This is because if a plurality of the relay coils La or Lb are energized at the same time, the power consumption on the side of the drives circuit 56 is temporarily increased, the load on the power supply circuit 58 or the power supply device 22 is rapidly increased, and the operation is adversely influenced.

As described above, the tap device 6 of the embodiment is provided with the operation switch 60 for inputting the command for the output of the high-frequency transmission signal via all of the branched output terminals T1 to T4 by manual operation. When the operation switch 60 is manually turned on, the control circuit 54 controls all the relays 41 to 44 to obtain the connected states, so that the high-frequency transmission signals are transmitted via the branched output terminals T1 to T4.

Therefore, according to the tap device 6 of the embodiment, it can be set, by the command signal transmitted from the center apparatus 2, that is, the received data received by the receiving circuit 52, whether or not to distribute the broadcasting signal, specifically the high-frequency transmission signal of the broadcasting signal and the command signal from the center apparatus 2 in the embodiment, to the subscriber terminal devices via the branched output terminals T1 to T4. Additionally, by operating the operation switch 60, the broadcasting signal can forcibly be distributed to the subscriber terminal devices on the site where the tap device 6 is installed.

Therefore, according to the present invention, by operating the operation switch 60 immediately after the work of installing the tap device 6 onto the transmission line 4 is completed, the distribution of the broadcasting signal to the subscribers' terminal devices can quickly be started. For example, when the repairing, changing, checking, or the like of the tap device 6 is performed, the distribution of the broadcasting signal to the subscribers can be prevented from being discontinued for a long time. Furthermore, the quality of the broadcasting service to the subscriber can be enhanced.

One embodiment of the present invention has been described above, but the present invention is not limited to the above-described embodiment, and can variously be modified.

For example, in the embodiment, by incorporating the splitting circuit 34 in the tap device, the broadcasting signals can be outputted via a plurality of branched output terminals T1 to T4 individually. However, the present invention can be applied, in the same manner as in the above-described embodiment, even to a tap device in which the splitting circuit 34 is not incorporated, and the output branched from the directional coupler 30, that is, the broadcasting signal is outputted as it is via one branched output terminal.

Moreover, in the above-described embodiment, the components constituting the tap device 6 are incorporated in three substrates P1, P2, P3. The third substrate P3 incorporating the branch output system of the broadcasting signal via the branched output terminals T1 to T4 from the splitting circuit 34, and the second substrate P2 incorporating the control system constituted of the directional couplers 30, 36, receiving circuit 52, control circuit 54, drive circuit 56, power supply circuit 58 and operation switch 60 can be detached from the first substrate P1 on the side of the housing, and can easily be changed. However, the present invention can be applied, in the same manner as in the above-described embodiment, even to a tap device in which all the constituting elements are mounted onto one substrate, or in which the circuits are mounted onto two substrates.

What is claimed is:

1. A tap device of a cable broadcasting system, connected to a transmission line leading to a terminal side from a center apparatus for branching a part of a transmission signal running through the transmission line to a subscriber terminal device, comprising:

- a directional coupler for branching the part of the transmission signal running through said transmission line and transmitting the branched transmission signal to each of a plurality of signal paths leading to corresponding branched output terminals;
- a plurality of latching relays, each latching relay being disposed on a corresponding signal path for switching the signal path to one of a connected state and a disconnected state to a corresponding branched output terminal;
- a receiving circuit for receiving from the transmission line a command signal indicating whether the latching relay is to be switched to the connected state or to the disconnected state to provide the branched transmission signal to the corresponding branched output terminal; and
- a control means for controlling the connected and disconnected state of each latching relay and corresponding signal path to a corresponding branched output terminal, including
  - a control circuit connected from the receiving circuit and responsive to the command signal for providing a plurality of latching relay control signals to the latching relays to control the connected and disconnected state of each latching relay,
  - a manual operation switch for providing a manual output command to the control circuit,
    - the control circuit being responsive to the manual output command to generate the latching relay control signal to each of the plurality of latching relays directing each of the latching relays into the connected state to provide the branched transmission signal to each of the branched output terminals, wherein
  - if the control circuit receives the command to switch a plurality of latching relays, the control circuit energizes a plurality of targeted latching relays in sequence, instead of energizing the same simultaneously, to place each of the plurality of latching relays in the connected and disconnected states in sequence.

2. The tape device of the cable broadcasting system according to claim 1, further comprising:

a splitting circuit for splitting the transmission signal branched by said directional coupler into a plurality of signals, and outputting the split transmission signals via a plurality of branched output terminals, wherein the latching relays are disposed in a plurality of signal paths leading from the splitting circuit to the plurality of branched output terminals.

3. A tap device of a cable broadcasting system, connected to a transmission line leading to a terminal side from a center apparatus for branching a transmission signal to branched output terminals, comprising:

a plurality of signal paths providing the branched transmission signal to corresponding branched output terminals, a plurality of latching relays for connecting for disconnecting corresponding ones of the signal paths to corresponding ones of the branched output terminals, each latching relay being disposed on a corresponding signal path for switching the signal path to one of a connected state and a disconnected state to a corresponding branched output terminal, and the latching relays are placed in the connected and the disconnected states by a single command signal which produces successive energization of the latching relays controlled by that single command signal;

a control means responsive to the single command signal from the transmission line for controlling the successive energization of each of the latching relays controlled by that single command signal, and a manual operation switch for providing a manual output command to the control means, the control means responsive to the command signal for placing each latching relay in a connected or disconnected state and to the manual output command to place each latching relay into the connected state.

4. A tap device of a cable broadcasting system, connected to a transmission line leading to a terminal side from a center apparatus for branching a part of a transmission signal running in a forward direction through the transmission line to a subscriber terminal device, comprising:

a directional coupler for branching a part of the transmission signal running through said transmission line and transmitting the branched transmission signal to each of a plurality of forward signal paths leading to corresponding branched output terminals;

a plurality of latching relays, each of the plurality of latching relays being disposed ion a corresponding forward signal path for switching the signal path to one of a connected state and a disconnected state to a corresponding branched output terminal;

a receiving circuit for receiving a command signal indicating whether the plurality of latching relays are to be switched to the connected state or to the disconnected state to provide the branched transmission signal to the corresponding branched output terminal; and a control means for controlling the connected and disconnected state of each latching relay and corresponding forward signal path to a corresponding branched output terminal, including a control circuit connected to the receiving circuit and responsive to the command signal for providing a plurality of latching relay control signals to the plurality of latching relays to control the connected state and disconnected state of each latching relay, the control circuit sequentially generating a sequence of the latching relay control signals to each of the plurality of latching relays in sequence and directing each of the latching relays into the connected state and disconnected state; and a splitting circuit for splitting the transmission signal branched by said directional coupler into a plurality of signals, and outputting the split transmission signals via a plurality of branched output terminals, the latching relays are disposed in a plurality of signal paths leading from the splitting circuit to the plurality of branched output terminals.

5. The tap device of the cable broadcasting system according to claim 1, wherein if the control circuit receives the command signal from the receiving circuit to switch a plurality of latching relays or the manual output command, the control circuit energizes the plurality of targeted latching relays in sequence, instead of energizing the same simultaneously, to place each of the plurality of latching relays in the connected and disconnected states in sequence.

6. The tap device of the cable broadcasting system according to claim 3, wherein if the control means receives the single command signal to switch the plurality of latching relays to the connected state or disconnected state or the manual output command to place each of the plurality of latching relays in the connected state, the control means switches a plurality of targeted latching relays in sequence, instead of switching the same simultaneously, to place each of the plurality of latching relays in the connected and disconnected states in sequence.

7. The tap device of the cable broadcasting system according to claim 1, wherein if the control circuit receives the command signal to switch the plurality of latching relays, the control circuit energizes a plurality of targeted relay coils corresponding to the latching relays in sequence, instead of energizing the same simultaneously, to place each of the plurality of latching relays in the connected and disconnected states in sequence.

8. The tap device of the cable broadcasting system according to claim 3, wherein the plurality of latching relays are placed in the connected and the disconnected states by the single command signal which produces successive energization of relay coils corresponding to the latching relays controlled by that single command signal; and the control means responsive to the single command signal from the transmission line controls the successive energization of each of the relay coils corresponding to the latching relays, in sequence instead of energizing the same simultaneously, controlled by that single command signal.

9. The tap device of the cable broadcasting system according to claim 4, wherein the control circuit sequentially generates a sequence of the latching relay control signals to each of a plurality of relay coils corresponding to the latching relays in sequence, instead of energizing the same simultaneously, and directs each of the latching relays into the connected state and disconnected state.

10. The tap device of the cable broadcasting system according to claim 5, wherein if the control circuit receives the command signal from the receiving circuit to switch the plurality of latching relays on the manual output command, the control circuit energizes a plurality of targeted relay coils corresponding to the latching relays in sequence, instead of energizing the same simultaneously, to place each of the plurality of latching relays in the connected and disconnected states in sequence.

11. The tap device of the cable broadcasting system according to claim 6, wherein if the control means receives the single command signal to switch the plurality of latching relays to the connected state or disconnected state or the manual output command to place each of the plurality of latching relays in the connected state, the control means switches a plurality of targeted relay coils corresponding to the latching relays in sequence, instead of switching the same simultaneously, to place each of the plurality of latching relays in the connected and disconnected states in sequence.

* * * * *